United States Patent [19]

Hirata et al.

[11] Patent Number: 5,244,706

[45] Date of Patent: Sep. 14, 1993

[54] OPTICAL RECORDING DISK

[75] Inventors: Hideki Hirata; Toshifumi Tanaka, both of Miyota; Setsuko Shibuya; Atsuko Motai, both of Saku, all of Japan

[73] Assignee: TDK Corporation, Tokyo, Japan

[21] Appl. No.: 840,065

[22] Filed: Feb. 25, 1992

[30] Foreign Application Priority Data

Feb. 27, 1991 [JP] Japan ................................ 3-56182

[51] Int. Cl.[5] ............................................. B32B 3/00
[52] U.S. Cl. ....................................... 428/64; 428/65; 428/212; 428/457; 428/913; 430/945; 346/76 L; 346/135.1
[58] Field of Search ........................... 428/64, 65, 913; 430/945; 346/76 L, 135.1; 369/288

[56] References Cited

U.S. PATENT DOCUMENTS 4,994,354 2/1991 Toibana et al. .................... 430/945

Primary Examiner—Patrick J. Ryan
Assistant Examiner—Elizabeth Evans
Attorney, Agent, or Firm—Watson, Cole, Grindle & Watson

[57] ABSTRACT

An optical recording disk includes a resin substrate having a recording layer thereon and a protective glass substrate, which are joined into an integral disk such that the recording layer is inside. The resin substrate is formed of a resin composition comprising a specific cyclic polyolefin and an optional alkyl phenol condensate. The resulting lightweight, rigid disk is adapted for recording/reproducing operation at high rotational speeds with few focusing errors due to minimized axial runouts.

7 Claims, 3 Drawing Sheets

OPTICAL RECORDING DISK

This invention relates to optical recording disks including rewritable magneto-optical recording disks, phase change type optical recording disks, and write-once optical recording disks.

BACKGROUND OF THE INVENTION

Optical recording disks have recording layers on substrates. Recording and reproducing operation is generally carried out by directing a laser beam or similar light to the recording layers through the substrates. Therefore, the substrates used are formed of transparent materials, for example, glass and resins. For a weight reduction and ease of formation of tracking grooves and pits, conventional optical recording disks used resinous substrates. Polymethyl methacrylate and polycarbonate were frequently employed.

Polymethyl methacrylate has excellent optical properties including a low coefficient of optical elasticity and a very low double refraction or birefringence, but is poor in dimensional stability due to high water absorption and low heat resistance.

Therefore, polycarbonates having low water absorption and relatively high heat resistance are used most often. However, the polycarbonates have a high coefficient of optical elasticity and often high birefringence since their polymer chain tends to orient in a flow direction. For achieving a higher recording density and higher transfer rate, it was attempted in recent years to use disks of a larger diameter of at least 200 mm and carry out recording/reproducing operation at a high number of revolutions of at least 1,800 rpm. Injection molding of polycarbonates into such large diameter substrates incurs birefringence which is further increased through application of stresses during high speed rotation, resulting in a lowering of reproduced outputs. The polycarbonates are not fully low in water absorption so that large size substrates will undergo substantial distortion. Some lack of rigidity causes axial runouts and focus tracking errors during high rotational speed driving at 1,800 rpm or higher, especially at 3,000 rpm or higher. In addition, the recording layers can be corroded by potential penetration of moisture through polycarbonate substrates.

To meet the recent demand for high rotational speed driving at 1,800 rpm or higher, especially at 3,000 rpm or higher, substrates having higher mechanical strength should be used. Glass substrates have the high risk of failure when the disks are accidentally dropped or hit. Particularly when chemically tempered glass of high strength is used, it can fracture into scattering fragments. Glass substrates also have the problem that grooves useful as a pre-format information carrier cannot be formed.

To protect the recording layer from mechanical damage as by scratching, it is convenient to provide a protective plate on the recording layer or to mate a pair of substrates such that the recording layer is inside.

SUMMARY OF THE INVENTION

A primary object of the invention is to provide an optical recording disk having resin and glass substrates joined which can be operated at high rotational speeds without axial runouts or distortion while ensuring satisfactory recording/reproducing performance and durability.

This and other objects are achieved in accordance with the present invention by an optical recording disk comprising a resin substrate, a recording layer on the resin substrate, and a protective glass substrate. The resin and glass substrates are joined into an integral disk such that the recording layer is inside. The resin substrate is formed of a resin composition comprising a cyclic polyolefin having a recurring structural unit of the following formula.

Formula:

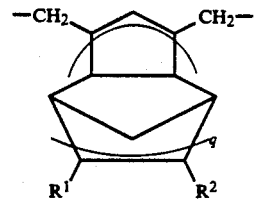

In the formula, q is equal to 0 or a positive integer, $R^1$ and $R^2$ are independently selected from the group consisting of a hydrogen atom, halogen atom, hydrocarbon group, ester group, nitrile group, and heterocyclic group, and $R^1$ and $R^2$, taken together, may form a ring. The resin composition may contain 0 to 2% by weight of an alkyl phenol condensate. Recording/reproducing operation is performed while rotating the disk at 1,800 rpm or higher.

In one preferred embodiment, the resin substrate includes a skin layer having a thermal softening point of up to about 140° C., more preferably about 100° to 140° C. under the surface thereof bearing the recording layer. Then the resin substrate has the thermal softening point of the skin layer and a secondary thermal softening point higher by at least 10° C. than the skin layer thermal softening point. Such substrates can be formed by injection molding the resin composition.

In an embodiment wherein the recording layer contains a dye, a reflective layer is formed on the recording layer.

The recording layer may be formed directly on the resin substrate by a vapor phase deposition method. Alternatively, an undercoat layer intervenes between the resin substrate and the recording layer, and the undercoat layer may also be formed by a vapor phase deposition method.

By using one substrate formed of a cyclic polyolefin resin composition for bearing a recording layer thereon and another substrate formed of glass for protection, there is obtained a lightweight, rigid, reliable optical recording disk. The disk can accommodate high speed rotation at 1,800 rpm or higher, especially at 3,000 rpm or higher without dynamic axial runouts or distortion. Since one substrate is formed of resin, the optical disk is protected against failure upon accidental falling or scattering of glass fragments even if failed is prevented. The optical disk wherein a recording layer is formed on the substrate of cyclic polyolefin resin composition which is integrated with the protective substrate of glass avoids birefringence which can interfere with recording/reproducing operation. Since the cyclic polyolefin substrate side on which recording/reproducing operation is conducted is resistant to heat and humidity, the disk as a whole is substantially free of distortion or degradation during long-term storage under high or low-temperature and high or low-humidity conditions. Additionally, the cyclic polyolefin absorbs little water, which feature ensures that the recording layer is protected against moisture on the both sides and that axial runout is suppressed since the substrate itself is free of deflection incurred by water absorption.

DETAILED DESCRIPTION OF THE INVENTION

Figure 1:
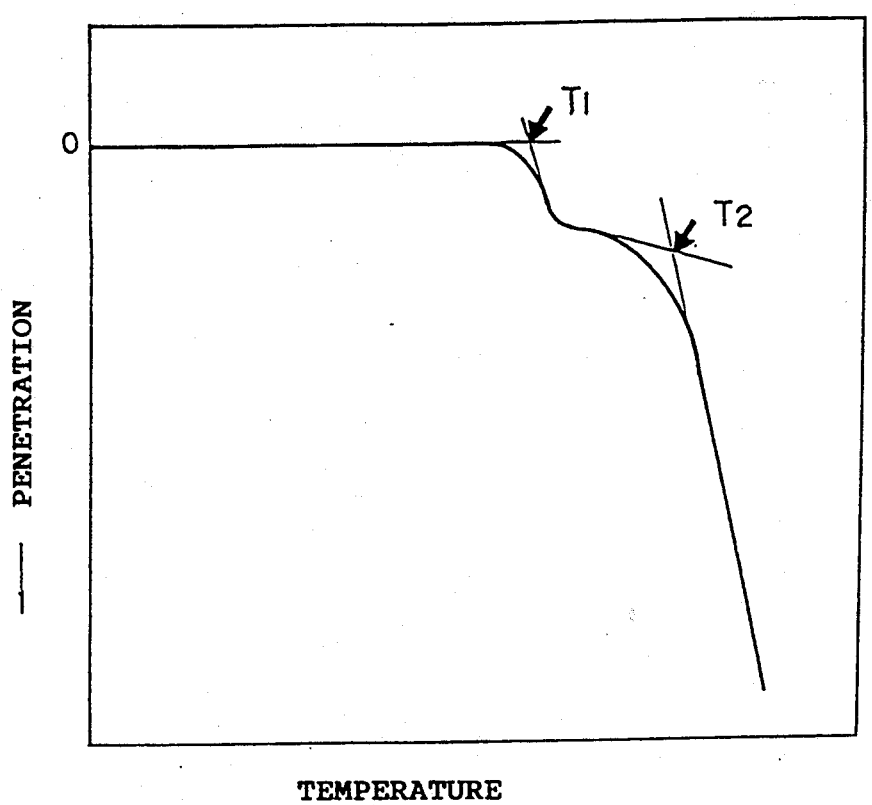
FIG. 1 is a graph plotting the penetration relative to temperature of a cyclic polyolefin substrate, illustrating the thermal softening point thereof.

The substrate used herein should be substantially transparent to recording and reproducing light, typically semiconductor laser light having a wavelength of about 600 to 900 nm, often about 700 to 800 nm, most often 780 nm. A light transmittance of at least 80% is preferred. This permits recording/reproducing operation from the rear surface of the substrate.

The substrate used in the present invention is formed of a resin composition comprising a cyclic polyolefin having a recurring structural unit of the following formula.

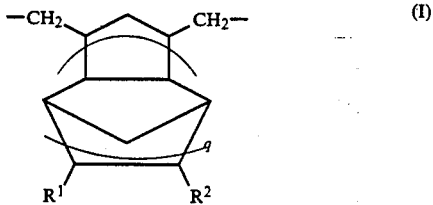

In the formula, q is equal to 0 or a positive integer, $R^1$ and $R^2$ are independently selected from the group consisting of a hydrogen atom, halogen atom, hydrocarbon group, ester group, nitrile group, and heterocyclic group, and $R^1$ and $R^2$, taken together, may form a ring. Preferably $R^1$ and $R^2$ are hydrocarbon groups, more preferably unsubstituted alkyl groups having 1 to 5 carbon atoms.

The cyclic polyolefins used are preferably homopolymers consisting of recurring units of formula (I) although copolymers comprising recurring units of formula (I) wherein q, $R^1$ and $R^2$ are different are acceptable. Also included are copolymers comprising recurring units of formula (I) and other structural units such as ethylene. They preferably have a number average molecular weight of from about 5,000 to 100,000, especially from about 10,000 to 40,000.

In formula (I), the halogen atom, ester group, nitrile group, and heterocyclic group such as pyridyl represented by $R^1$ and $R^2$ are sometimes designated polar groups.

The cyclic polyolefins may be obtained as saturated polymers by polymerizing monomers in accordance with conventional ring-opening techniques, and hydrogenating the resulting open-ring polymers in accordance with conventional techniques. Exemplary monomers include norbornene and alkyl and/or alkylidene substituted ones thereof, for example, 5-methyl-2-norbornene, 5,6-dimethyl-2-norbornene, 5-ethyl-2-norbornene, 5-butyl-2-norbornene, and 5-ethylidene-2-norbornene; dicyclopentadiene, 2,3-dihydrodicyclopentadiene, and alkyl (e.g., methyl, ethyl, propyl, and butyl) substituted ones thereof, and polar group (e.g., halogen) substituted ones thereof; dimethanooctahydronaphthalene and alkyl and/or alkylidene substituted ones thereof, and polar group (e.g., halogen) substituted ones thereof, for example, 6-methyl-1,4:5,8-dimethano-1,4,4a,5,6,7,8,8a-octahydronaphthalene, 6-ethyl-1,4:5,8-dimethano-1,4,4a,5,6,7,8,8a-octahydronaphthalene, 6-ethylidene-1,4:5,8-dimethano-1,4,4a,5,6,7,8,8a-octahydronaphthalene, 6-chloro-1,4:5,8-dimethano-1,4,4a,5,6,7,8,8a-octahydronaphthalene, 6-cyano-1,4:5,8-dimethano-1,4,4a,5,6,7,8,8a-octahydronaphthalene, 6-pyridyl-1,4:5,8-dimethano-1,4,4a,5,6,7,8,8a-octahydronaphthalene, and 6-methoxycarbonyl-1,4:5,8-dimethano-1,4,4a,5,6,7,8,8a-octahydronaphthalene; and trimers and tetramers of cyclopentadiene, for example, 4,9:5,8-dimethano-3a,4,4a,5,8,8a,9,9a-octahydro-1H-benzoindene and 4,11:5,10:6,9-trimethano-3a,4,4a,5,5a,6,9,9a,10,10a,11,11a-dodecahydro-1H-cyclopentaanthracene.

These cyclic polyolefins are described in JP-A 223341/1991 and Japanese Patent Application No. 26024/1985. Commercially available ones such as Zeonex 280 from Nippon Zeon K.K. may be used.

No limit is imposed on the dimensions of substrates. In general, substrates have a thickness of about 1.0 to 1.5 mm and a diameter of about 80 to 380 mm. It is noteworthy that little axial runout occurs even with a diameter of more than 200 mm when substrates are formed of the resin composition defined herein. The exact dimensions of the substrate vary with a particular application. The substrates on the surface may be provided with a pattern in the form of grooves and pits carrying pre-format information. The substrates may be integrally formed with hubs in which glass fibers may be incorporated for preventing crazing and cracking.

Under its surface bearing the recording layer, the preferred cyclic polyolefin base substrate includes a skin layer having a thermal softening point of up to about 140° C., especially about 100° to 140° C., more preferably about 100° to 135° C., most preferably about 110° to 135° C. A skin layer having a thermal softening point of up to 140° C. would not only enhance the adhesion between the substrate and an overlying layer formed by a gas phase deposition technique, for example, but also improve recording sensitivity and C/N when a recording dye layer and a reflective layer are formed thereon. A skin layer having a thermal softening point of lower than 100° C. would be less resistant against heat encountered during deposition of a reflective layer thereon, low in dimensional accuracy, and less compatible with coating of a recording layer thereon.

For the skin layer forming a surface layer of the substrate, the thermal softening point is defined as follows. Measurement is made by placing a cylindrical needle having a diameter of about 1 mm in cross section on a substrate to be tested and applying a load of about 5 grams. While heating the substrate from a temperature of about 30° C. at a rate of about 2° C./min., the penetration of the loaded needle is measured.

FIG. 1 shows the penetration plotted in relation to temperature. In the penetration vs temperature profile of the cyclic polyolefin base substrate, there develop two, first and second, bend points in contrast to the fact that substrates which are cast or injection molded from other resins develop only one bend point (corresponding to the second bend point in FIG. 1) or a faint first bend point, if any, in the penetration vs temperature profile. Such a penetration vs temperature profile is measurable by means of a commercially available thermo-mechanical analyzer (TMA), for example, TMA Model 943 manufactured by E. I. duPont.

The first stage penetration corresponding to the first bend point in FIG. 1 is up to about 200 μm in most samples. It is thus believed that the first bend point is attributable to the softening point of the skin layer or substrate surface layer. In proximity to the first bend point of the penetration vs temperature profile, the thermal softening point of the skin layer is defined as the intersection, designated T1, between a rectilinear trail of the straight section before the onset of needle penetration and a rectilinear extension of the first stage penetration. As previously defined, primary softening point T1 is limited up to about 140° C., especially from about 100° to 140° C.

In proximity to the second bend point of the penetration vs temperature profile, the secondary thermal softening point of the substrate is defined as the intersection, designated T2, between a rectilinear extension of the transition from the first to second stage penetration and a rectilinear extension of the second stage penetration. It is believed that the secondary thermal softening point T2 is the thermal softening point of the substrate at its interior. Preferably, the secondary thermal softening point T2 is higher than the secondary thermal softening point T1 by at least 10° C., more preferably by 10° to 50° C. Typically, T2 is at least 140° C., especially from about 145° to 180° C. because improvements in dimensional accuracy, mechanical properties, and heat resistance are expectable.

It is to be noted that the skin layer is observable as a layer of different color from the underlying area in a SEM image of a cross section of the substrate transverse to its surface. The thickness of the skin layer generally ranges from about 1 to 200 μm, especially from about 10 to 100 μm.

Such a skin layer can be established by various means, preferably by injection molding the resin composition. When the composition is cast, for example, it has only the secondary thermal softening point T2, i.e., ordinary softening point. To establish a skin layer by injection molding the resin composition, molding parameters should be properly selected. Preferred molding parameters include an injection pressure of about 250 to 400 kg/cm$^2$, a melt temperature of about 300° to 400° C., and a mold temperature of pressure and mold clamping force may be as usual. It is to be noted that T1 of the cyclic polyolefin is somewhat altered by adding an alkyl phenol condensate to be described below.

If desired, the substrate may be formed with an oxygen impermeable coating on its outer surface and outer periphery surface. Further, the substrate on the recording layer bearing surface may be provided with tracking grooves.

To the cyclic polyolefin is preferably added at least one alkyl phenol condensate. The alkyl phenol condensate serves as a lubricant for the base resin and is typically of formula (II).

$$R^3-A-O-L_n-Y \quad \text{(II)}$$

In formula (II), $R^3$ is an alkyl, alkyloxy, or alkylcarbonyl group, A is an aromatic or alicyclic group, L is an alkylenoxy or epoxy group, n is an integer of from 1 to 30, and Y is hydrogen or an alkyl group.

More particularly, $R^3$ in formula (II) is a substituted or unsubstituted, linear or branched alkyl, alkyloxy, or alkylcarbonyl group having about 3 to about 30 carbon atoms, with the alkyl groups being preferred. The preferred substituent, if any on these groups, is a hydroxyl group.

A is a substituted or unsubstituted aromatic group such as phenylene and naphthylene groups or a substituted or unsubstituted alicyclic group such as cyclohexylene group, with a p-phenylene group being preferred. The phenylene or naphthylene group represented by A may have attached thereto a substituent such as linear or branched alkyl groups having about 1 to 10 carbon atoms and an additional —O—$L_n$—Y linkage which will be described later.

L is an alkylenoxy group. Preferred alkylenoxy groups are represented by —$R^4$O— wherein $R^4$ is a substituted or unsubstituted, linear or branched alkylene group having 1 to about 5 carbon atoms, especially 1 to 3 carbon atoms. The preferred substituent, if any on these groups, is a hydroxyl group. L is also an epoxy group which may have a lower alkyl substituent. Letter n representing the number of recurring alkylenoxy or epoxy groups is an integer of from 1 to 30, especially from 1 to 20.

Y is hydrogen or a substituted or unsubstituted, linear or branched alkyl group having 1 to about 5 carbon atoms, especially 1 to 3 carbon atoms. Preferred are a hydrogen atom and alkyl groups having a hydroxyl group or a carboxy group or a salt thereof attached thereto. A carbonyl or ether bond may be contained in Y.

Illustrative examples of the alkyl phenol condensate are given below.

| $R^3$ | A | L | n | Y |
| --- | --- | --- | --- | --- |
| 2,4-dimethylheptyl | p-phenylene | 2-hydroxy-n-propenoxy | 1 | H |
| 2,4-dimethylheptyl | p-phenylene | ethenoxy | 2 | H |
| isooctyl | p-phenylene | ethenoxy | 12 | H |
| isooctyl | o-methyl-p-phenylene | ethenoxy | 10 | H |
| isododecyl | p-phenylene | ethenoxy | 13 | H |
| isohexyl | p-phenylene | ethenoxy | 7 | H |
| oleyl | p-phenylene | ethenoxy | 25 | H |
| lauroyl | p-phenylene | ethenoxy | 16 | H |
| isobutyl | p-phenylene | ethenoxy | 3 | H |
| decyl | p-phenylene | ethenoxy | 30 | H |
| isononyl | p-phenylene | ethenoxy | 8 | H |
| tetradecyl | p-phenylene | ethenoxy | 12 | H |
| triisoheptyl | p-naphthylene | ethenoxy | 25 | H |
| isooctyl | p-phenylene | 1-methyl-ethenoxy | 20 | H |
| isododecyl | p-phenylene | 2-hydroxy-n-propenoxy | 11 | H |
| cyclohexyl | cyclohexylene | 1-methyl-ethenoxy | 3 | H |
| isobutyl | o,m-diisobutyl-p-phenylene | ethenoxy | 5 | H |
| isobutyl | o,m-diisobutyl-p-phenylene | ethenoxy | 6 | H |
| caproyl | p-phenylene | ethenoxy | 3 | carboxymethyl |
| isobutyl | p-phenylene | epoxy | 3 | H |
| isohexyl | p-phenylene | ethenoxy | 7 | H |
| isooctyl | p-phenylene | ethenoxy | 6 | H |
| isododecyl | p-phenylene | ethenoxy | 13 | H |

| R³ | A | L | n | Y |
|---|---|---|---|---|
| oleyl | p-phenylene | ethenoxy | 25 | H |

These alkyl phenol condensates may be obtained in accordance with the conventional method for preparing nonionic surfactants, by condensing a propylene or butylene polymer with phenol and then reacting the condensate with ethylene oxide or the like. Long chain oleins may be used instead of propylene and butylene.

The alkyl phenol condensates used herein preferably have a decomposition temperature of about 250° to 350° C. especially about 290° to 340° C. as measured by a differential scanning calorimeter (DSC). If the decomposition temperature is below the limit, a noticeable amount of gas would evolve during molding or substrates would have a lower glass transition temperature. Condensates having a higher decomposition temperature would be less compatible with the cyclic polyolefin.

In the practice of the invention, substrates are manufactured by injection molding a resin composition. The alkyl phenol condensate is preferably added to resin pellets with which the injection molding machine is charged. In injection molding such resin pellets into a substrate, about 96 to 100% of the alkyl phenol condensate added to the resin pellets is retained in the substrate, enabling substrates to be precisely reproduced to the designed physical properties.

The resin composition of which substrates are formed should preferably contain 0 to about 2% by weight, more preferably about 0.3 to about 2% by weight, most preferably about 0.5 to about 1.5% by weight of the alkyl phenol condensate. Higher contents of the alkyl phenol condensate would evolve gases during molding so that some voids might be left in the molded substrate, resulting in a lowering of disk quality.

Where recording layers are coated films of dyes or the like as in the case of write-once optical recording disks, higher contents of the alkyl phenol condensate are not recommended because dye application becomes difficult. From the aspect of dye film application, the alkyl phenol condensate content should be up to about 2% by weight and preferably as low as possible. In the case of rewritable magneto-optical recording disks and other optical recording disks where recording layers are formed by gas phase deposition techniques or in the case of coated dye films where a reflective layer is formed thereon by gas phase deposition techniques, the addition of alkyl phenol condensates is effective for improving the adhesion between the substrate and the overlying (typically recording) layer. The addition of alkyl phenol condensates is also effective for improving injection moldability by increasing the flow of the base resin. From the aspect of dye film adhesion to substrates, therefore, the alkyl phenol condensate content should preferably be about 0.3% by weight or higher because the recording layer which is formed by a gas phase deposition technique can otherwise separate after long-term storage in a hot humid environment.

When about 0.3 to about 2% by weight, especially about 0.5 to about 1.5% by weight of the alkyl phenol condensate is added to the cyclic polyolefin, the condensate can best function as a lubricant for improving injection molding capability and the resin flow during molding.

Preferably, the resin composition should be substantially free of a lubricant other than the alkyl phenol condensate. Deleterious lubricants to be excluded from the present composition include ester lubricants such as glycerin monoesters, glycerin diesters, palmitates, and ethylene glycol monoesters; fatty acid lubricants such as stearic acid, behenic acid, and arachidic acid; and fatty acid amide lubricants such as erucic acid amide and eicosenoic acid amide. Inclusion of such lubricants is deleterious to the application of dye films.

It is acceptable that the resin composition contain other additives such as stabilizers, anti-oxidants, and UV. absorbers.

A recording layer is formed on the substrate directly or through a suitable undercoat or intermediate layer. Various optical recording disk structures are completed by forming a protective layer, reflective layer or the like on the recording layer, if necessary, and joining a protective glass substrate to the recording layer-bearing resin substrate.

The optical recording disks include magneto-optical recording disks in which information is magnetically recorded by a modulated thermal beam or modulated magnetic field and reproduced through magneto-optical conversion; erasable disks such as optical recording disks having a phase change type recording layer wherein information is recorded and reproduced by way of a change in reflectivity; and write-once disks such as optical recording disks of the air sandwich structure having a pit-formation type recording layer in which pit formation results in a change of reflectivity and optical recording disks additionally having a reflective layer corresponding to the compact disk (CD) and laser disk (LD) standards.

The optical recording disks are rotated at a number of revolutions of at least 1,800 rpm for recording/reproducing operation. With a number of revolutions of lower than 1,800 rpm, the benefits of output increase and noise reduction according to the invention are not significantly manifested. The upper limit of the number of revolutions is generally about 5,400 rpm and the rotating system may be either CAV or CLV.

Figure 2:
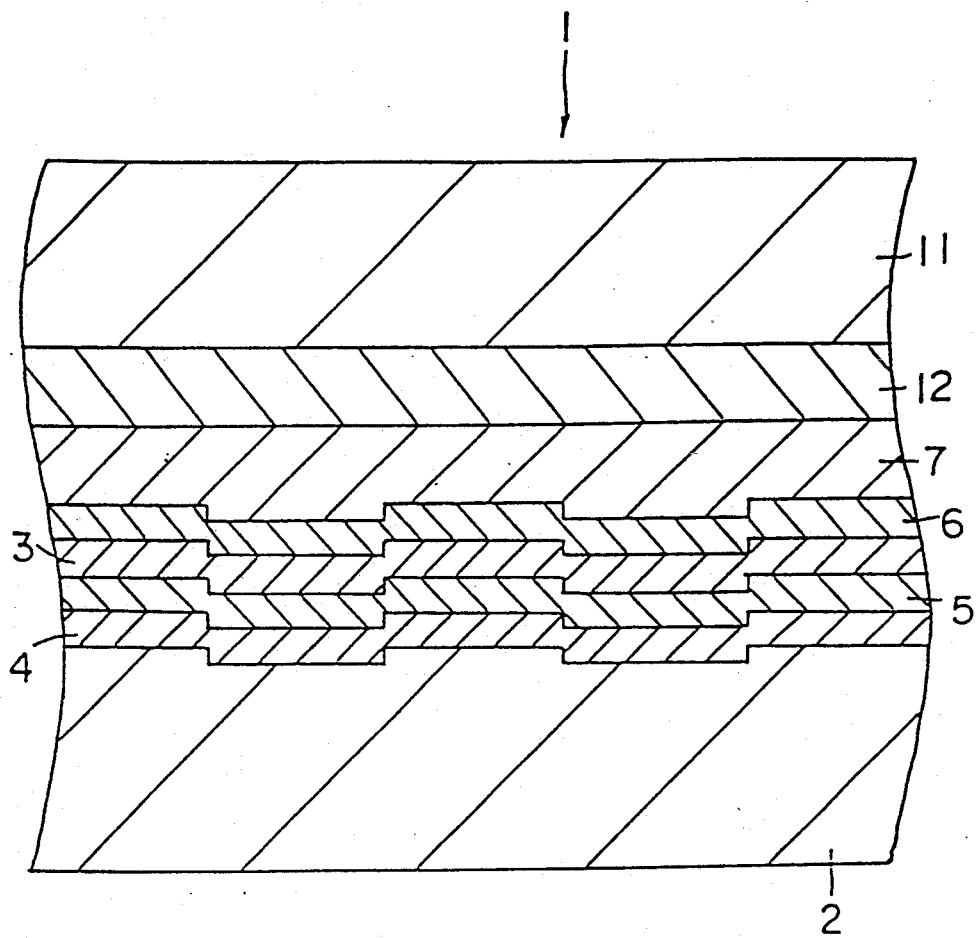
FIG. 2 is a fragmental cross-sectional view of a magneto-optical recording disk according to one preferred embodiment of the invention.

Referring to FIG. 2, there is illustrated in fragmentary cross section an optical recording disk according to one embodiment of the invention. The magneto-optical recording disk generally designated at 1 includes a substrate 2. The disk 1 has a protective layer 4 and an intermediate layer 5 as an undercoat, a recording layer 3, a protective layer 6, a protective coat 7, an adhesive layer 12, and a protective substrate 11 stacked one on top of another on the substrate 2 in the stated order.

The intermediate layer 5 is provided for improving C/N ratio and may be formed of any dielectric material to a thickness of about 30 to 150 nm.

In addition to the protective layer 4, another protective layer 6 may be formed over the recording layer 3. When both the protective layers 4 and 6 are formed, they may be of an identical or different composition. Since these protective layers 4 and 6 serve to improve corrosion resistance, at least one of them should preferably be provided, most preferably both. The protective layers 4 and 6 are preferably inorganic thin films of an oxide, carbide, nitride, sulfide or a mixture thereof. Alternatively, they may be formed of the same type of material as the intermediate layer. They have a thickness of about 30 to 300 nm for corrosion resistance enhancement.

The protective layers 4 and 6 and intermediate layer 5 may be formed by any gas phase deposition method, for example, sputtering, evaporation, and ion plating, with sputtering being preferred.

In this embodiment, the recording layer 3 is a layer in which information is magnetically recorded by means of a modulated thermal beam or a modulated magnetic field and then reproduced through magneto-optical conversion. The material of the recording layer 3 is not critical insofar as magneto-optical recording is possible. Preferably, an alloy containing a rare earth metal, more preferably a rare earth metal and a transition metal is sputtered, evaporated or ion platted to form an amorphous film, with sputtering recommended. The rare earth metals used herein include Tb, Dy, Nd, Gd, Sm, and Ce, and mixtures thereof. The transition metals include Fe and Co. Preferably the alloy consists essentially of Fe and Co in a total content of 65 to 85 atom % and the balance of a rare earth metal or metals. The preferred recording layer has a composition: TbFeCo, DyTbFeCo, NdDyFeCo, NdGdFeCo, and the like. The recording layer may contain up to 10 atom % of an additional metal or metals selected from Cr, Al, Ti, Pt, Si, Mo, Mn, V, Ni, Cu, Zn, Ge, and Au. Also, the recording layer may contain up to 10 atom % of another rare earth metal or metals selected from Sc, Y, La, Ce, Pr, Pm, Sm, Eu, Ho, Er, Tm, Yb, and Lu.

The recording layer 3 generally has a thickness of about 10 to about 1,000 nm.

Even when the recording layer 3 and intermediate layer 5 as the undercoat layer are formed by a gas phase deposition method, typically sputtering, the skin layer developed in the substrate is effective in preventing the overlying layers 3, 5 from separating from the substrate 2.

A protective coat 7 is preferably provided on the second protective layer 6 for the purpose of improving corrosion resistance. It may be formed from various resinous materials, typically UV-curable resins to a thickness of about 0.1 to 100 $\mu$m. Although the protective coat 7 may be a deposited layer or a preformed sheet, it is preferably formed by coating a composition of a radiation. curable compound and a photopolymerization sensitizer and curing the coating with radiation.

The protective substrate 11 is attached for the purpose of protecting the recording layer from physical damage. The protective substrate 11 which is mated with the resin substrate 2 is of glass. By using one substrate formed of glass and another substrate formed of a cyclic polyolefin resin composition, there is obtained a lightweight, rigid, reliable optical disk. The disk can accommodate high speed rotation at 1,800 rpm or higher, especially at 3,000 rpm or higher without dynamic axial runout or distortion. Formation of one substrate from resin prevents a failure of the optical disk upon accidental falling or scattering of glass fragments even when failed. The preferred embodiment of optical disk wherein a recording layer is formed on the substrate 2 of cyclic polyolefin resin composition which is integrated with the protective substrate 11 of glass avoids birefringence which can interfere with recording/reproducing operation, provides improved weatherability and durability, and is successful in minimizing axial runout during high rotational speed driving.

The glass of which the protective substrate 11 is made is not critical and even the use of opaque glass is acceptable. Recording/reproducing operation is normally conducted from the substrate 2 side although recording from the protective substrate 11 side is possible if it is of transparent glass.

Preferably the protective substrate 11 is formed of tempered glass because higher rigidity, weatherability and durability are obtained. The tempered glasses are generally classified into physically tempered glasses and chemically tempered glasses in terms of their strengthening method, and a choice may be made for a particular use. The tempered glass used herein is not particularly limited, that is, any of conventional tempered glasses may be used.

Among the tempered glasses, preferred are glasses surface tempered by chemical strengthening. In general, glass is chemically tempered by replacing alkali metal ions in proximity of the glass surface by alkali metal ions of another species from the exterior whereby compression stresses are induced at the glass surface by the difference in the spatial volume occupied by the ions, thereby increasing mechanical strength. Chemical tempering is generally carried out by heating an alkali metal salt such as a nitrate and sulfate salt and dipping the glass in the molten salt for several hours to several ten hours. More illustratively, soda glass may be strengthened by using $KNO_3$ as the molten alkali salt to thereby substitute K ions for Na ions in the glass. Lithium-containing glass may be strengthened by dipping it in $NaNO_3$ to substitute Na ions for Li ions in the glass. Since the strengthened or compression stressed layer is present only in proximity to the glass surface, there results a surface tempered glass. The strengthened or compression stressed layer is preferably to 200 $\mu$m, more preferably 30 to 75 $\mu$m thick.

The chemically tempered glass may be a soda-lime silicate glass as chemically tempered by the above method. An aluminosilicate glass as chemically tempered is more preferred because of its increased mechanical strength. The aluminosilicate glass preferably has an $Al_2O_3$ content of at least 10% by weight, especially 15 to 30% by weight. The preferred aluminosilicate glass used herein has the following composition:

| | |
|---|---|
| $SiO_2$ | 50 to 60% by weight |
| $Al_2O_3$ | 15 to 30% by weight |
| $B_2O_3$ | 1 to 10% by weight |
| $R(I)_2O$ | 10 to 25% by weight |
| $R(II)O$ | 1 to 10% by weight |
| $TiO_2$, etc. | 0 to 5% by weight | wherein R(I) and R(II) are monovalent and divalent metals, respectively, with the $K^+$ substitution being in the range of 0.01 to 1 $mg/cm^3$.

The protective substrate 11 has a sufficient thickness of about 0.5 to 2.0 mm to provide rigidity and a shape in geometrical conformity to the substrate 2.

The protective substrate 11 is integrated with the substrate 2 through the adhesive layer 12 such that the recording layer 3 is inside. A joint is achieved with any desired one of well-known adhesives.

Also, the present invention is applicable to optical recording disks having a recording layer of the phase change type which utilizes a change of reflectivity for recording and reproducing operation. The recording layer of this type includes Te-Se base alloys as disclosed in Japanese Patent Publication (JP-B) No. 41902/1979 and Japanese Patent No. 1004835, Te-Ge base alloys as disclosed in Japanese Patent Application Kokai (JP-A) No. 76035/1987, Te-In base alloys as disclosed in JP-A 56827/1988, Te-Sn base alloys as disclosed in Japanese Patent Application Nos. 307298/1986 and 307299/1986, Te oxides as disclosed in JP-A 54338/1983 and Japanese Patent Nos. 974257 and 974258, and other Te and Se base chalcogenides; alloys capable of amorphous-crystalline transition such as Ge—Sn and Si—Sn; and alloys capable of producing a color change through a crystal structure change such as Ag—Zn, Ag—Al—Cu, and Cu—Al and alloys capable of producing a grain size change such as In—Sb.

Any of these recording layers may have an undercoat layer or protective layer formed by a gas phase deposition method.

The embodiments of the present invention wherein the recording layer and the undercoat layer, if any, are formed by a gas phase deposition method, typically sputtering are adapted for phase change type optical recording disks having a metal recording layer and magneto-optical recording disks having a recording layer containing a rare earth metal element.

Figure 3:
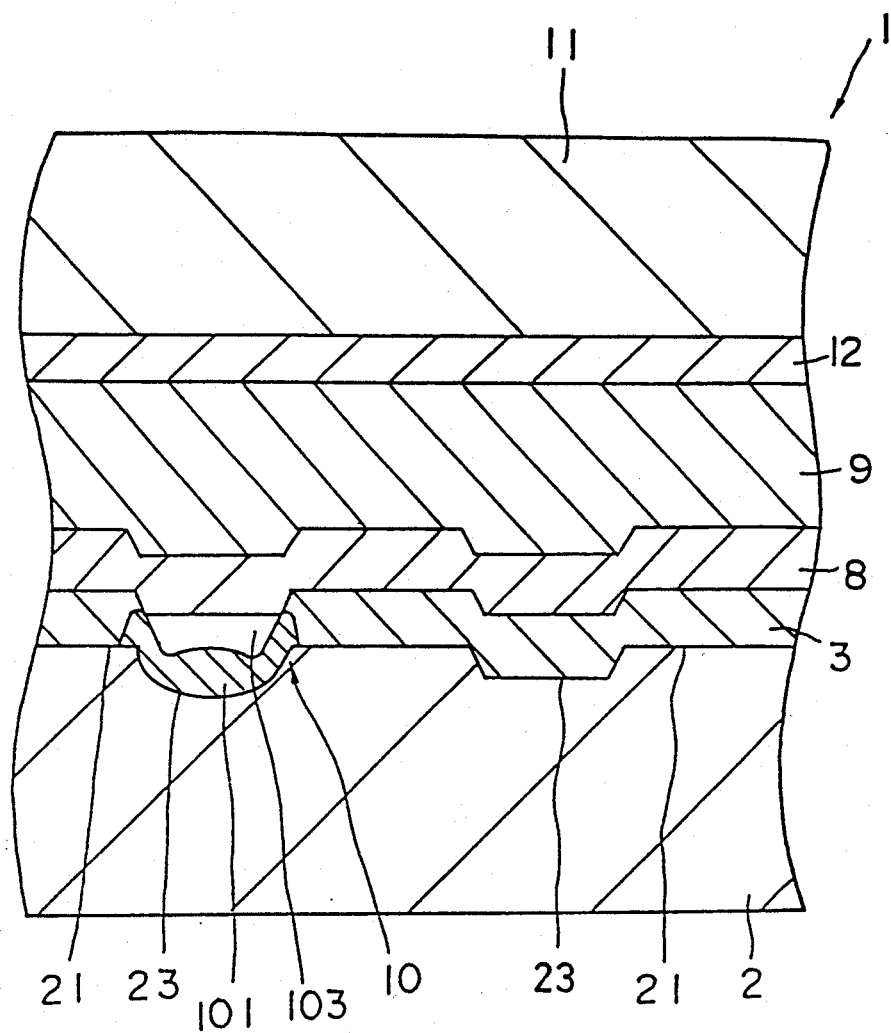
FIG. 3 is a fragmental cross-sectional view of an optical recording disk having a dye-containing recording layer according to another preferred embodiment of the invention.

FIG. 3 illustrates another preferred embodiment of the optical recording disk according to the invention. The disk 1 is an optical recording disk of the close contact type including a substrate 2, a dye-containing recording layer 3 on the substrate, and a reflective layer 8 and a protective layer 9 on the recording layer 3 in close arrangement. A protective substrate 11 of glass is integrated with the cyclic polyolefin base substrate 2 by attaching it to the protective layer 9 through an adhesive layer 12. The protective substrate 11 and adhesive layer 12 are the same as described above.

In this embodiment, the substrate is often provided with tracking grooves 23 as shown in FIG. 3. More particularly, on the surface of the substrate 2 where the recording layer 3 is formed, the upper surface in the illustrated embodiment, a groove 23 is formed for tracking purposes. The tracking groove 23 preferably consists of continuous spiral turns. Typically, the groove 23 has a depth of 250 to 1800 Å and a width of 0.2 to 1.1 $\mu$m, preferably 0.3 to 0.6 $\mu$m (width in a radial direction with respect to the disk center). The adjoining turns 23 are separated by a land 21 having a width of 0.5 to 1.4 $\mu$m, preferably 1.0 to 1.3 $\mu$m. With this groove configuration, tracking signals can be obtained without reducing the reflection level of the groove. The groove may be provided with recesses or projections for addressing signals.

Where the groove is formed in the surface of the substrate, a provision is preferably made such that recording light is directed to a recording layer within the groove. That is, the optical recording medium of the invention is preferably of the groove recording mode. The groove recording mode allows the recording layer to have an increased effective thickness.

The recording layer contains a light absorbing dye or a compatible mixture of two or more dyes. The light absorbing dye may be mixed with a quencher. An ionically bound combination of a dye cation and a quencher anion may also be used as the light absorbing dye.

The recording layer should preferably have a coefficient of extinction (the imaginary part of a complex index of refraction) k of from 0.03 to 0.25 at the wavelength of recording and reproducing light. With k of less than 0.03, the recording layer can have a lower absorptivity so that it might become difficult to record with a commonly used power, whereas k of more than 0.25 can result in a drop of reflectivity to below 60%, often failing to reproduce according to the CD standard.

The recording layer should preferably have an index of refraction (the real part of a complex index of refraction) n of from 1.8 to 4.0, more preferably 2.2 to 3.3 at the wavelength of recording and reproducing light. With n 1.8, reduced reflectivity would make it difficult to reproduce according to the CD standard. Few dyes are available which can achieve n>4.0.

In determining n and k, a sample is prepared by forming a recording layer on a given transparent substrate to a thickness of about 400 to 100 Å. Then the reflectivity of the sample is measured through the substrate or from the recording layer side. Reflectivity is measured in a mirror reflection mode (of the order of 5°) using light having the recording/reproducing wavelength. The transmittance of the sample is also measured. The index of refraction n and coefficient of extinction k may be calculated from these measurements according to K. Ishiguro, "Optics," Kyoritsu Publishing K.K., pages 168–178.

The light absorbing dyes used herein are not critical insofar as they have maximum absorption at a wavelength in the range of 600 to 900 nm, preferably 600 to 800 nm, more preferably 650 to 750 nm. Included are cyanine, phthalocyanine, naphthalocyanine, anthraquinone, azo, triphenylmethane, pyrylium or thiapyrylium salt, squarylium, and croconium dyes, and metal complex dyes. Preferred dyes are cyanine dyes, especially cyanine dyes having an indolenine ring, typically benzoindolenine ring.

In the practice of the invention, the recording layer is often formed by coating a solution of the dye in a suitable solvent. The solvents used in dye coating include ketone, ester, ether, aromatic, halogenated alkyl and alcohol solvents. Preferred are ketone solvents such as cyclohexanone, methyl ethyl ketone, and methyl isobutyl ketone. Ketone solvents have many advantages including increased solubility of dyes therein, improved quality of the resulting dye film, ease of application, and inertness that they do not chemically attack the substrate surface, all contributing to substantial improvements in quality of the optical recording medium.

Often the recording layer 3 has a thickness of about 500 to about 2,000 Å to provide sufficient reflectivity.

The reflective layer 8 is applied to the recording layer 3 in direct contact therewith. Any desired high reflectivity material, for example, Au, Ag, Cu and the like and alloys thereof may be used to form the reflective layer. The reflective layer 8 preferably has a thickness of at least about 500 Å. It can be formed by evaporation or sputtering. Although no upper limit is generally imposed on the thickness of the reflective layer, a thickness of up to about 1,200 Å is preferred for manufacturing cost and time. The reflective layer alone has a reflectivity of at least 90%, and the reflectivity of an unrecorded portion of the medium through the substrate can be at least 60%, especially at least 70%.

The protective layer 9 may be formed on the reflective layer 8. The protective layer may be formed from any desired resin material such as a UV-curable resin, usually to a thickness of about 0.1 to 100 $\mu$m. The protective layer may be either a layer or a sheet. The protective layer is preferably prepared by coating a composition of a radiation. curable compound and a photopolymerization sensitizer and curing the coating with radiation. Preferably, the protective layer has a hardness in the range of H to 8 H, especially 2 H to 7 H in pencil hardness at 25° C. according to JIS K-5400. This hardness range leads to an improved eye pattern and a substantial reduction of jitter. In addition, the protective layer will not separate from the underlying reflective layer during shelf storage under high-temperature, high-humidity conditions or varying temperature and humidity conditions. More specifically, the eye pattern can be disturbed and the jitter can increase if the protective layer is softer than pencil hardness H. A protective layer harder than 8 H becomes brittle and difficult to form or does not fully adhere to the underlying reflective layer.

The radiation curable compounds used in forming the protective layer include oligoester acrylates. The oligoester acrylates are oligoester compounds having a plurality of acrylate or methacrylate groups. Preferred oligoester acrylates have a molecular weight of 1,000 to 10,000, more preferably 2,000 to 7,000 and a degree of polymerization of 2 to 10, more preferably 3 to 5. Most preferred are polyfunctional oligoester acrylates having 2 to 6, especially 3 to 6 acrylate or methacrylate groups. In addition to or instead of the oligoester acrylates, there may be used radiation-curable compounds in the form of thermoplastic resins modified to be radiation sensitive.

The protective layer of such a radiation-curable compound preferably has a thickness of from about 0.1 to 30 $\mu$m, more preferably from about 1 to 10 $\mu$m. A protective layer of thinner than 0.1 $\mu$m is often difficult to form uniformly and insufficient as a moisture barrier in a humid atmosphere so that the underlying recording layer might become less durable. Jitter prevention also becomes insufficient. A protective layer thicker than 30 $\mu$m tends to invite distortion of the overall recording medium and cracking of the protective layer itself due to shrinkage upon curing.

The protective layer may be formed by any desired well-known technique, for example, spinner coating, gravure coating, spraying, dipping, and combinations thereof. The conditions under which the protective layer is formed may be determined by taking into account the viscosity of a coating composition, the desired coating thickness, and other factors without undue experimentation.

The radiation to which the coating is exposed may be ultraviolet (UV) radiation, electron radiation, or the like, with UV being preferred. For UV curing, a photopolymerization sensitizer is generally added to the radiation-curable compounds. As the photopolymerization sensitizer, any well-known compounds may be used, for example, benzoins such as benzoin methyl ether, benzoin ethyl ether, $\alpha$-methylbenzoin, and $\alpha$-chlorodeoxybenzoin, ketones such as benzophenone, acetophenone, and bisdialkylaminobenzophenone, quinones such as anthraquinone and phenanthraquinone, and sulfides such as benzyl disulfide and tetramethylthiuram monosulfide.

A coating containing a radiation-curable compound and a photopolymerization sensitizer as defined above may be cured with radiation by any well-known methods. For example, UV lamps such as xenon discharge lamps and mercury discharge lamps are used. If desired, electron radiation may be used.

Recording or additional recording may be carried out on the optical recording medium 1 of the construction shown in FIG. 3 by directing recording light having a wavelength of 780 nm, for example, in pulse form to the recording layer 3 in a groove 23 through the substrate 2 to form a pit 10. The recording layer 3 absorbs light so that it is heated while the substrate 2 is heated at the same time. As a result, the recording material, typically dye melts or decomposes near the interface between the substrate 2 and the recording layer 3, applying a pressure to the interface to deform the bottom and side walls of the groove 23.

The melted or decomposed products of the recording material leave a mass 101 on the bottom of the groove 23. Since the decomposed mass 101 somewhat invades the substrate where the skin layer having a certain thermal softening point covers, the pit 10 becomes convex toward the substrate and larger in dimensions than the geometry of the recording layer originally confined in the groove 23. The depression of the substrate is generally up to about 300 Å deep although it depends on the size of the pit 10 formed.

The decomposed mass 101 consists essentially of the decomposed product of the recording material or a mixture of the decomposed product of the recording material and the recording material, but does not substantially contain the substrate material. The decomposed mass 101 generally occupies about 30 to 100% of the original thickness of the recording layer 3 in the groove 23. Often, a space 103 is left above the decomposed mass 101 and below the reflective layer 8. In this regard, the decomposed mass 101 and space 103 form the pit 10. The space generally occupies about 5 to 70% of the original thickness of the recording layer 3.

It was empirically found that pits of well defined outer contour and constricted U shape were formed. The presence of the skin layer contributed to enlargement and configuration of pits and thus to C/N and sensitivity improvements.

Reproduction is carried out in a conventional manner by reading the pits with reproducing light. During recording and reproducing operation, the disk is often rotated at 1,800 rpm or higher.

Although an optical disk having a reflective layer in close contact with the recording layer has been described as a typical embodiment of the optical recording disk of the present invention, the present invention is also applicable to optical recording disks of the air sandwich structure having a recording layer is internally sealed through an air space or recording layers are opposed through an air space wherein pit formation results in a change of reflectivity.

EXAMPLE

Examples of the present invention are given below by way of illustration and not by way of limitation.

EXAMPLE 1

There were prepared pellets of Zeonex 280 as a cyclic polyolefin having recurring units of formula (I) having a number average molecular weight of 29,000. To the cyclic polyolefin pellets was added 1.2% by weight (based on the total composition) of a mixture of two alkyl phenol condensates of the following formulae (II-1) and (II-2) in a weight ratio of 3.2:1.

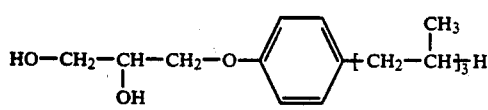

(II-1)

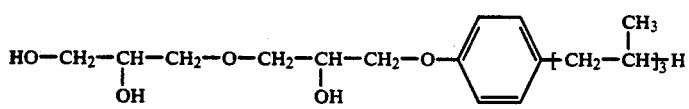

(II-2)

The pellets were melted at 350° C. and injection molded into a substrate having a diameter of 300 mm and a thickness of 1.2 mm at a mold temperature of 100° C. under an injection pressure of 350 kg/cm². There was obtained a substrate sample No. 1.

The substrate was measured for thermal softening point by means of a TMA under the conditions: a cylindrical needle having a diameter of 1 mm in cross section, an applied load of 5 grams, and a heating rate of 2° C./min. A profile representing the penetration of the loaded needle with rising temperature was measured, and primary and secondary thermal softening points T1 and T2 were calculated therefrom. This substrate had T1 of 124° C. and T2 of 156° C. A SEM image of the substrate also indicated the presence of a skin layer having a thickness of up to about 100 μm.

On the substrate, a protective layer of glass was deposited by RF magnetron sputtering to a thickness of 40 nm. On the protective layer, an intermediate layer of SiNx was deposited by RF magnetron sputtering to a thickness of 80 nm. On the intermediate layer, a recording layer of Tb23Fe72Co5 was deposited by sputtering to a thickness of 80 nm. On the recording layer, another protective layer of the same composition as the first one was deposited by RF magnetron sputtering to a thickness of 100 nm. On the protective layer, a protective coat was formed by applying a UV curable resin containing an oligoester acrylate followed by UV curing to a thickness of 5 μm. A protective substrate of glass was adhesively attached to the substrate on the protective coat. The protective substrate was a disk having a diameter of 300 mm and a thickness of 1.2 mm of chemically tempered aluminosilicate glass. The adhesive was a hot-melt adhesive based on pinene resin which was applied by means of a roll coater to a thickness of 80 μm. There was completed a single sided magneto-optical recording disk, designated sample No. 1, of the structure shown in FIG. 2.

Separately, a comparative magneto-optical recording disk, designated sample No. 2, was similarly fabricated using a substrate formed by injection molding bisphenol A type polycarbonate (number average molecular weight 15,000) under optimum conditions, i.e., a melt temperature of 340° C., a mold temperature of 100° C., and an injection pressure of 300 kg/cm².

These magneto-optical recording disks were measured for instantaneous runout acceleration. Using a mechanical precision tester, the disk was measured for runout acceleration at intervals of 5 mm over an annular region of radially extending from 60 to 130 mm from the disk center while rotating the disk at 1,800 rpm. The atmosphere was at a temperature of 80° C. and a relative humidity of 80%. Three samples were used for each magneto-optical recording disk and an average of maximum runout accelerations was determined.

The runout acceleration is expressed by the acceleration of an optical pickup during focusing servo, representing the degree of flatness of the disk substrate having tracking grooves formed therein. The ISO standard recommends that the runout acceleration be up to 20 m/s², especially up to 10 m/s² for magneto-optical recording disks having an outer diameter of 130 mm.

The inventive sample (No. 1) using a cyclic polyolefin base substrate showed an instantaneous runout acceleration of less than 20 m/s², which was a significant improvement over 55 m/s² for the comparative sample (No. 2) using a polycarbonate substrate.

EXAMPLE 2

Substrate samples, designated Nos. 3, 4 and 5 were molded by repeating the procedure of sample No. 1 in Example 1 except that the alkyl phenol condensate content was changed to 0%, 0.8%, and 2.3% by weight of the total composition, respectively. Another substrate sample, designated No. 6, was prepared by injection molding the same pellets as sample No. 1, but under different conditions: a melt temperature of 330° C., a mold temperature of 80° C., and an injection pressure of 370 kg/cm². Sample No. 6 had a skin layer thermal softening point in excess of 140° C.

Gas void traces were observed in substrate sample No. 5 which contained 2.3% by weight of the alkyl phenol condensate.

Using substrate sample Nos. 3, 4, and 6, magneto-optical disks were fabricated in the same manner as in Example 1.

Disk sample Nos. 1, 3, 4, and 6 were subjected to a corrosion test. The samples were allowed to stand at a temperature of 80° C. and a relative humidity of 85% for 2,500 hours before the interface between the substrate and the overlying layers was visually observed with naked eyes and under an optical microscope. The samples were evaluated excellent (OO) when they remained intact, good (O) when a few minor blisters of about 10 to 100 μm developed, fair (Δ) when blisters developed locally, but apparently, and poor (X) when blisters developed over the entire surface and separation occurred at the interface.

The results are shown in Table 1.

TABLE 1

| Sample No. | Alkyl phenol condensate content (wt %) | Thermal softening point (°C.) | | Storage stability |
|---|---|---|---|---|
| | | T1 | T2 | |
| 3 | 0 | 134 | 165 | Δ |
| 4 | 0.8 | 129 | 160 | oo |
| 1 | 1.2 | 124 | 156 | oo |
| 6 | 1.2 | 142 | 165 | Δ |

Disk sample Nos. 3, 4 and 6 showed an instantaneous runout acceleration of less than 20 m/s².

EXAMPLE 3

There were used substrate sample No. 1 (Example 1), Nos. 3 to 6 (Example 2), and No. 7. Substrate sample No. 7 was the same as No. 3 except that the alkyl phenol condensate was replaced by 1.2% by weight of a lubricant mixture of glycerin monoester and glycerin diester.

On each substrate having grooves separated by lands was formed a recording layer containing a cyanine dye. While the substrate was rotated at 500 rpm, a solution of the dye in cyclohexanone was applied to the substrate by spin coating. After drying, the dye layer had a thickness of 140 Å in grooves and 90 Å on lands.

The recording layer had an index of refraction (n) of 2.6 and a coefficient of extinction (k) of 0.06. The index of refraction (n) and coefficient of extinction (k) of the recording layer were determined by applying a dye solution onto a test substrate to a dry thickness of 100 Å and measuring the n and k of the resulting recording layer. The measurement was made according to K. Ishiguro, "Optics," Kyoritsu Publishing K.K., pages 168-178.

It was impossible to coat the dye solution on sample Nos 5 and 7.

On the recording layer, an Au film of 1,000 Å thick was formed as a reflective layer by sputtering. A protective film was formed thereon by spin coating a UV-curable coating composition containing a polyfunctional oligoester acrylate and a photopolymerization sensitizer. UV curing of the coating resulted in a protective film having a pencil hardness of 2 H and a thickness of 5 μm.

In this way, there were obtained optical recording disk samples designated Nos. 11, 13, 14, and 16 corresponding to substrate sample Nos. 1, 3, 4, and 6, respectively.

The disk samples were measured for sensitivity. The recording sensitivity is the recording power (expressed in mW) at which maximum signals are obtained at a recording frequency of 8 MHz and 1,800 rpm. The results are shown in Table 2.

TABLE 2

| Sample No. | Alkyl phenol condensate content (wt %) | Thermal softening point (°C.) T1 | Thermal softening point (°C.) T2 | Sensitivity (mW) | Storage stability |
|---|---|---|---|---|---|
| 13 | 0 | 134 | 165 | 11.6 | Δ |
| 14 | 0.8 | 129 | 160 | 10.9 | ∞ |
| 11 | 1.2 | 124 | 156 | 10.7 | ∞ |
| 16 | 1.2 | 142 | 165 | 14.7 | Δ |

The effectiveness of the invention is evident from Table 2.

Disk sample Nos. 11, 13, 14 and 16 showed an instantaneous runout acceleration of less than 20 m/s$^2$.

BENEFITS OF THE INVENTION

There has been described an optical recording disk having a cyclic polyolefin base substrate bearing a recording layer and a mating glass substrate which disk is adapted for recording/reproducing operation at high rotational speeds with fewer focus tracking errors due to minimized axial runouts of the mated substrates. The presence of a desired skin layer in the resin substrate increases recording sensitivity, improves the adhesion between the recording layer and the substrate which contributes to durability during storage in hot humid atmospheres, and allows the recording layer to be coated with ease.

While the invention has been described in what is presently considered to be a preferred embodiment, other variations and modifications will become apparent to those skilled in the art. It is intended, therefore, that the invention not be limited to the illustrative embodiments, but be interpreted within the full spirit and scope of the appended claims.

We claim:

1. An optical recording disk comprising a resin substrate, a recording layer on the resin substrate, and a protective glass substrate, the resin and glass substrate being joined into an integral disk such that the recording layer is inside;

said resin substrate including a skin layer under the surface thereof bearing the recording layer and said skin layer having a thermal softening point of about 100 to 140 degrees C., said resin substrate further having the softening of the skin layer and a secondary thermal softening point by at least 10 degrees C. higher than the skin layer thermal softening point;

said resin substrate being formed of a resin composition comprising the cyclic polyolefin having a recurring structural unit of the formula:

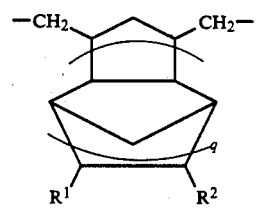

wherein q is equal to 0 or a positive integer, R$^1$ and R$^2$ are independently selected from the group consisting of a hydrogen atom, halogen atom, hydrogen group, ester group, nitrile group, and the heterocyclic group, and R$^1$ and R$^2$, taken together, may form a ring.

2. The optical recording disk of claim 1 wherein recording/reproducing operation is performed while rotating the disk at 1,800 rpm or higher.

3. The optical recording disk of claim 1 wherein said resin substrate is formed by injection molding the resin composition.

4. The optical recording disk of claim 1 wherein said recording layer contains a dye, and said disk further includes a reflective layer on said recording layer.

5. The optical recording disk of claim 1 wherein said recording layer is formed directly on said resin substrate by a vapor phase deposition method.

6. The optical recording disk of claim 1 which further includes an undercoat layer between said resin substrate and said recording layer, wherein said recording and undercoat layers each are formed by a vapor phase deposition method.

7. The optical recording disk of claim 1 wherein said resin composition contains 0 to 2% by weight of an alkyl phenol condensate.

* * * * *